US008752119B2

(12) United States Patent
Ramsdell

(10) Patent No.: US 8,752,119 B2
(45) Date of Patent: Jun. 10, 2014

(54) METHODS AND APPARATUS FOR CREATING CUSTOMIZED SERVICE RELATED INFORMATION FOR CUSTOMER DEVICES

(75) Inventor: Scott Ramsdell, Charlotte, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 440 days.

(21) Appl. No.: 12/780,648

(22) Filed: May 14, 2010

(65) Prior Publication Data

US 2011/0283323 A1 Nov. 17, 2011

(51) Int. Cl.
*H04N 7/16* (2011.01)

(52) U.S. Cl.
USPC ........................................... 725/135; 725/50

(58) Field of Classification Search
USPC .................................................. 725/50, 135
See application file for complete search history.

(56) References Cited

U.S. PATENT DOCUMENTS

| | | | | |
|---|---|---|---|---|
| 6,583,825 | B1 * | 6/2003 | Yuen et al. | 348/731 |
| 7,051,359 | B2 * | 5/2006 | Kim et al. | 725/131 |
| 2003/0149981 | A1 * | 8/2003 | Finster et al. | 725/46 |
| 2004/0078817 | A1 * | 4/2004 | Horowitz et al. | 725/58 |
| 2005/0210138 | A1 * | 9/2005 | Zigmond et al. | 709/227 |
| 2007/0061840 | A1 * | 3/2007 | Walter et al. | 725/39 |

* cited by examiner

*Primary Examiner* — Brian T Pendleton
*Assistant Examiner* — Olugbenga Idowu
(74) *Attorney, Agent, or Firm* — Straub & Pokotylo; Michael P. Straub; Stephen T. Straub

(57) ABSTRACT

Methods and apparatus for generating and distributing customized channel map information used by set top boxes to access program channels and provide access to content delivery services are described. One or more regional headends broadcast base channel maps. Set top boxes request base channel map enhancement information from a server which may service multiple regions, e.g., regions corresponding to different head ends. The channel map server dynamically generates base channel map enhancement information, or identifies previously generated base channel map enhancement information, based on one or more business policy rules applicable to the individual set top box requesting the update channel map enhancement information. The channel map server may be implemented nationally or covering multiple regions, and customization of channel maps for set top boxes can be implemented on customer, business or even an individual set top box basis based on business policy rules.

18 Claims, 7 Drawing Sheets

500

| | 502 | 504 | 506 | 508 |
|---|---|---|---|---|
| | SERVICE ID | SERVICE NAME | CHANNEL DISPLAY NUMBER | LOGO ID |
| 512 | 0000 | NBC | 1 | L1 |
| 514 | 0001 | ABC | 2 | L2 |
| 516 | 0010 | FOX SPORTS | 3 | L3 |
| 520 | ⋮ N | ⋮ N | ⋮ N | ⋮ N |

FIG. 5

600

| | 602 | 604 | 606 | 608 | 610 | 612 | 614 | 616 |
|---|---|---|---|---|---|---|---|---|
| | SERVICE ID | SERVICE TYPE | SOURCE ID | ENTITLEMENT ID | CHANNEL DISPLAY NUMBER | SERVICE NAME | APPLICATION ID | GUIDE ID |
| 620 | 0000 | REGULAR | 00001 | A1 | 3 | NBC | 000 | G1 |
| 622 | 0001 | REGULAR | 00010 | A2 | 5 | ABC | 001 | G2 |
| 624 | 0010 | REGULAR | 00011 | B1 | 6 | FOX SPORTS | 010 | G3 |
| 626 | 0011 | ON DEMAND | 00100 | B2 | 2 | HBO | 011 | G4 |
| 628 | 0100 | ON DEMAND | 00101 | C1 | 1 | ESPN | 100 | G5 |
| 630 | 0101 | REGULAR | 00110 | A3 | 15 | MSNBC | 101 | G6 |
| 632 | 0110 | REGULAR | 00111 | C2 | 9 | HBO | 110 | G7 |
| 634 | 0111 | ON DEMAND | 01000 | B4 | 11 | SCIFI | 111 | G8 |
| 636 | ⋮ N | ⋮ N | ⋮ N | ⋮ N | ⋮ N | ⋮ N | ⋮ N | ⋮ N |

FIG. 6

700

| | 702 | 704 | 706 | 708 | 710 |
|---|---|---|---|---|---|
| | SOURCE ID | SERVICE NAME | CONTENT TYPE | PROGRAM NUMBER | CORRESPONDING FREQUENCY |
| 712 | 00001 | NBC | ANALOG VIDEO | - | F1 |
| 714 | 01001 | NBC | ANALOG VIDEO | - | F2 |
| 716 | 00010 | HBO | DIGITAL VIDEO | PN1 | F3 |
| 718 | 00100 | CNN | DIGITAL VIDEO | PN2 | F4 |
| 720 | ⋮ N | ⋮ N | ⋮ N | ⋮ N | ⋮ N |

FIG. 7

800

| | 802 SERVICE ID | 804 SERVICE NAME | 806 CHANNEL DISPLAY NUMBER | 808 LOGO ID |
|---|---|---|---|---|
| 812 → | 0010 | FOX SPORTS | 1 | L3 |
| 814 → | 0100 | ESPN | 2 | L9 |
| 816 → | 0000 | NBC | 5 | L1 |
| | ⋮ N | ⋮ N | ⋮ N | ⋮ N |

FIG. 8

900

| | 902 SERVICE ID | 904 SERVICE NAME | 906 CHANNEL DISPLAY NUMBER | 908 LOGO ID |
|---|---|---|---|---|
| 912 → | 0000 | NBC | 1 | L1 |
| 914 → | 0001 | ABC | 2 | L2 |
| 916 → | 0010 | FOX SPORTS | 7 | L3 |
| 918 → | 0011 | HBO | 9 | L4 |
| | ⋮ N | ⋮ N | ⋮ N | ⋮ N |

FIG. 9

1000

| | 1002 ENTITLEMENT ID | 1004 HUB ID | 1006 CORRESPONDING BASE CHANNEL MAP |
|---|---|---|---|
| 1012 → | A1 | H1 | BM1 |
| 1014 → | A2 | H2 | BM2 |
| 1016 → | B1 | H2 | BM2 |
| 1018 → | B2 | H3 | BM3 |
| 1020 → | B3 | H4 | BM7 |
| | ⋮ N | ⋮ N | ⋮ N |

FIG. 10

METHODS AND APPARATUS FOR CREATING CUSTOMIZED SERVICE RELATED INFORMATION FOR CUSTOMER DEVICES

FIELD OF THE INVENTION

The present invention relates to methods and apparatus for creating and/or distributing channel map information, e.g., channel map enhancement information to one or more user devices, e.g., set top boxes.

BACKGROUND OF THE INVENTION

Information corresponding to a set of channels that a particular device, e.g., set top box (STB), or set of devices are entitled to receive, is often communicated in a file sometimes referred to as a channel map file. The channel map file is normally distinct from other files used to communicate program guide information. The set top box is expected to enforce subscriptions and not access programs and/or services listed in a guide file but which are not included in the program channel map corresponding to the particular set top box.

Program guide information, e.g., information about broadcast and/or on-demand video or audio programs including, for example, the title of a program, program channel number, broadcaster such as MSNBC, CBS, etc. as well as enhanced guide information are often communicated to a set top box regardless of whether or not the set top box is entitled to display a particular channel. Thus guide information can be generated and distributed in a limited number of files with the understanding that a set top box will display the guide information relevant to the services it is entitled to receive and/or which the system allows to be listed in the displayed guide even though access to the service may be blocked for an individual subscriber. The guide information is normally generated and communicated separately from other files used to control actual access to content, e.g., the full set of programs which are available.

While a set top box may receive a file, e.g., a service definition file providing information used to generate a program guide such as a grid guide, actual access to the guide information and the corresponding program content is controlled separately at the set top box based on other information and files such as channel map files which are normally accessed based on a particular set top box's right to receive access to the channels in a particular channel map.

Thus, in conjunction with information identifying what channel map a particular set top box should access, one or more channel map files are used to indicate to a set top box the services to which it is entitled. The channel map file normally includes a list of service identifiers and the corresponding service names. A channel map file may also include information on a channel number to be displayed along with information indicating a LOGO associated with the service which may be displayed. A set top box knows based on the one or more channel maps which it is entitled to access the services it is entitled to receive. Details relating to the services included in a channel map as well as program guide information relating to the services are normally provided in files other than a channel map file.

The services which a particular customer is entitled to receive is often a matter of a business policy, e.g., customers subscribing to a particular plan or package in a geographic region plan may be entitled to a particular channel package.

Channel map information like program guide and other information is normally communicated from regional or local headends with set top boxes accessing the channel map or maps to which it is entitled as indicated by, e.g., an entitlement ID communicated to a set top box. The communication from regional or local headends of channel map and guide information is normally implemented using broadcast file servers. Such servers normally broadcast files on a recurring basis.

Unfortunately broadcast file servers are limited, in both terms of their storage capacity and bandwidth allotted to the broadcast file server for communicating channel map information. Hotel chains are an example of one type of business which often desires a custom channel package and channel ordering. For example, a large hotel chain may want particular line up and ordering of news and/or information channels throughout all its hotels regardless where in the country they are located. Unfortunately, with limited broadcast file server resources this may be difficult to justify on a national basis because of the resources required to provide customized hotel channel maps in all regions of the country. While in areas where the hotel chain has a large number of hotels, e.g., on the east coast, it might be worthwhile to dedicate the limited available broadcast server resources to the hotel chain. However hotel chain has one or a few hotels it might be difficult or not practical from a cost perspective to provide the same customized channel maps to the hotels of the hotel chain. Thus with the broadcast file server based approach individual custom channel maps might be difficult or impractical to support on a nationwide basis.

Furthermore, while in one region customization of a channel map for a business may make sense due to the number of customers corresponding to the business in the region, the fact that the same business has few customers in another geographic region may make it impractical to allow that business to have a business specific channel map in the other region due to the limited capacity of the broadcast file server system used to distribute the channel maps. Also, from a management perspective the loading of custom channel maps into multiple regional or local headends for a business may be difficult and not justifiable in certain regions due to the business's limited number of customers or locations in a particular region.

Given the constraints on the number limits of different channel maps that can be communicated using the broadcast communications model, the degree of customization of service packages and channel maps has been somewhat limited. Small business who would like a customized package of services and customized channel map for their limited number of locations are often forced to pick from a predetermined number of predefined packages or take local video server based approaches to developing a customized channel package.

The shortcomings of the broadcast file server approach to delivering channel map information will be apparent from a review of FIG. 1 which illustrates a known system 100 for content delivery and distribution. Communications system 100 includes a regional network headend 102 which serves a limited geographic region. Multiple headends 102 are used, one per region, when large areas need to be serviced. The service headend 102 serves a corresponding set of customer premise devices, e.g., set top boxes (STBs), in the given region including set box 1 130 through set top box Y 132. In addition, the system 100 also includes a billing server 105. Customer premise STB devices 130, 132 are coupled to the network head end 102 via a communications network 125, e.g. a cable network. Billing server 105 processes and stores account, services and billing related information corresponding to the customers serviced by network headend 102.

The network headend 102 includes an applications server 103 and a network controller 112. Application server 103 is implemented as a broadcast file server (BFS). The application server 103 under the control of a system administrator creates a service definitions file 104 that describes the attributes of a service. The application server 103 further generates and stores a plurality of channel map files 106, 108, and a catalog file 110. The channel map files 106, 108 include a service identifier indentifying one or more services corresponding, e.g., to different program files. Set top box device location, user subscriptions, and/or other entitlement information determine which channel map files a particular set top box is allowed to access. The catalog file 110 includes criteria for associating channel map files 106 through 108 to a given set of STB devices. The set top boxes can determine from the catalog file which channel maps they are allowed to access. Thus, the information in the catalog file can be used in determining which channel map files a particular set top box is entitled to use and the information is used by the set top box for this purpose.

The service definition file, catalog file and one or more channel map files are broadcast from server 103 on a recurring basis, e.g., over one or more predetermined channels. The set top boxes listen to the broadcast channels and then access the information, channels and/or services to which they are entitled to access.

While the system shown in FIG. 1 works well if there is a single region, e.g., advertising region, to be serviced, an area serviced by a headend is often divided into many different regions. The different regions are often for targeted advertising purpose with many of the advertising regions receiving broadcast program streams due to different advertisement content even when the television programming content being delivered is the same. To the extent a customized channel map is being used by a business customer, that channel map must be distributed, stored and broadcast in all regions in which the business customer has a facility, e.g., business site including STB. As discussed above this can be difficult to manage and may tax the limited resources of a broadcast file server system for regions where there are many customers seeking the use of customized channel maps.

In view of the above discussion, it should be appreciated that there is a need for improved methods and apparatus for providing customization of channel and service packages such as those which can be achieved by the distribution of customized channel maps. It would be desirable if at least some methods could be developed which allowed for customization of service packages without limitations without the need for a large number of devices in a particular region to justify the customization. In particular, it would be desirable if businesses such as hotels could be offered the benefits of customized channel maps on a multi-regional or national basis without having to have all regional headends broadcast the customized channel maps. It would also be desirable if in at least some embodiments, updated and/or customized channel maps could be generated based on a set of business or policy rules in an automated manner without a large amount of human intervention at regional headend sites.

SUMMARY OF THE INVENTION

Methods and apparatus for generating and distributing customized channel map information used by set top boxes to access program channels and provide access to content delivery services, e.g., program channels are described. In some embodiments the customized channel maps are implemented and distributed in the form of base channel map enhancement (BCME) information files.

In various embodiments one or more regional headends broadcast base channel maps. Set top boxes request base channel map enhancement information from a channel map server which may service multiple regions, e.g., regions corresponding to different headends. The channel map server dynamically generates, e.g., on demand in response to requests, base channel map enhancement information, or identifies previously generated base channel map enhancement information, based on one or more business policy rules applicable to the individual set top box requesting the channel map enhancement information. Since the channel map server may be implemented nationally or covering multiple regions, customization of channel maps for set top boxes can be implemented on an individual set top box basis. Based on business policy rules applicable to a customer customized channel maps may be generated and supplied to one or more geographic regions. For example, set top boxes corresponding to hotel chains may receive enhancement channel map information which causes the set top boxes to display program channels in an order which is the same nationally for all hotels in the hotel chain and may include a hotel channel corresponding to the hotel chain which is not included in the base channel map. Set top boxes which are not capable of sending requests to the channel map server use the base channel maps to obtain access to basic services provided to devices throughout a region but may be unable to access services provided through the use of enhanced channel maps generated by the channel map server. Through the use of the interactive channel map server, business policy rules can be used to easily change the channel maps and services provided to set top boxes being serviced by multiple different head end offices. In addition, the number of different business packages and level of channel map customization can be far greater than is possible where the channel maps are constrained by the number of different channel maps regional head end office broadcast file servers are able to store and distribute. In accordance with the invention neighbors who receive the same base channel map may be provided significantly different channel line ups depending on the services to which they subscribe while it is also possible to provide the same channel line up and services to set top boxes corresponding to the same businesses, e.g., hotel chain, without concern over which regional headend is servicing a particular set top box corresponding to the hotel chain.

It should be appreciated that all features need not be used or included in all embodiments and that a wide variety of variations are possible. Guide and service definition information may be provided to set top boxes even for channels and services which a set top box is not entitled to receive. The distribution of guide and/or service definition information in files which are separate from the channel map information files allows for a separation in responsibilities in terms of creation of the different information files and also allows for the different files to be distributed differently. The number of guide and service definition files may be fewer than the number of channel map files since many different channel maps may access the same guide and/or service definition files.

Various additional features and advantages of the present invention are discussed in the detailed description which follows.

BRIEF DESCRIPTION OF THE DRAWINGS

FIG. 5 illustrates an exemplary base channel map file delivered from a network headend to one or more set top box devices, in accordance with the invention.

FIG. 6 illustrates an exemplary service definitions file delivered from a network headend to one or more set top box devices, in accordance with the invention.

FIG. 7 illustrates an exemplary source definitions file delivered from a network headend to one or more set top box devices, in accordance with the invention.

FIGS. 8 and 9 illustrate two different channel map enhancement files, generated by the channel map server shown in FIG. 2, and delivered to two different set top box devices in accordance with one embodiment of the invention.

FIG. 10 illustrates an exemplary catalog file delivered from a network headend to one or more set top box devices, in accordance with the invention.

DETAILED DESCRIPTION

Various methods and apparatus for creating and distributing channel maps, e.g., customized for individual businesses and/or according to a wide range of businesses policies, will now be described. In accordance with the invention, a set of customized channel maps may be provided on a national or multi-region basis without the need for the headend of each individual region to broadcast the customized channel maps.

The channel map information generated and distributed in accordance with the invention may be used by set top boxes to access program channels and thereby obtain access to various content delivery services, e.g., VOD (video on demand) and/or other services. In some embodiments the channel maps are implemented and distributed in the form of base channel map enhancement (BCME) information files.

Figure 1:
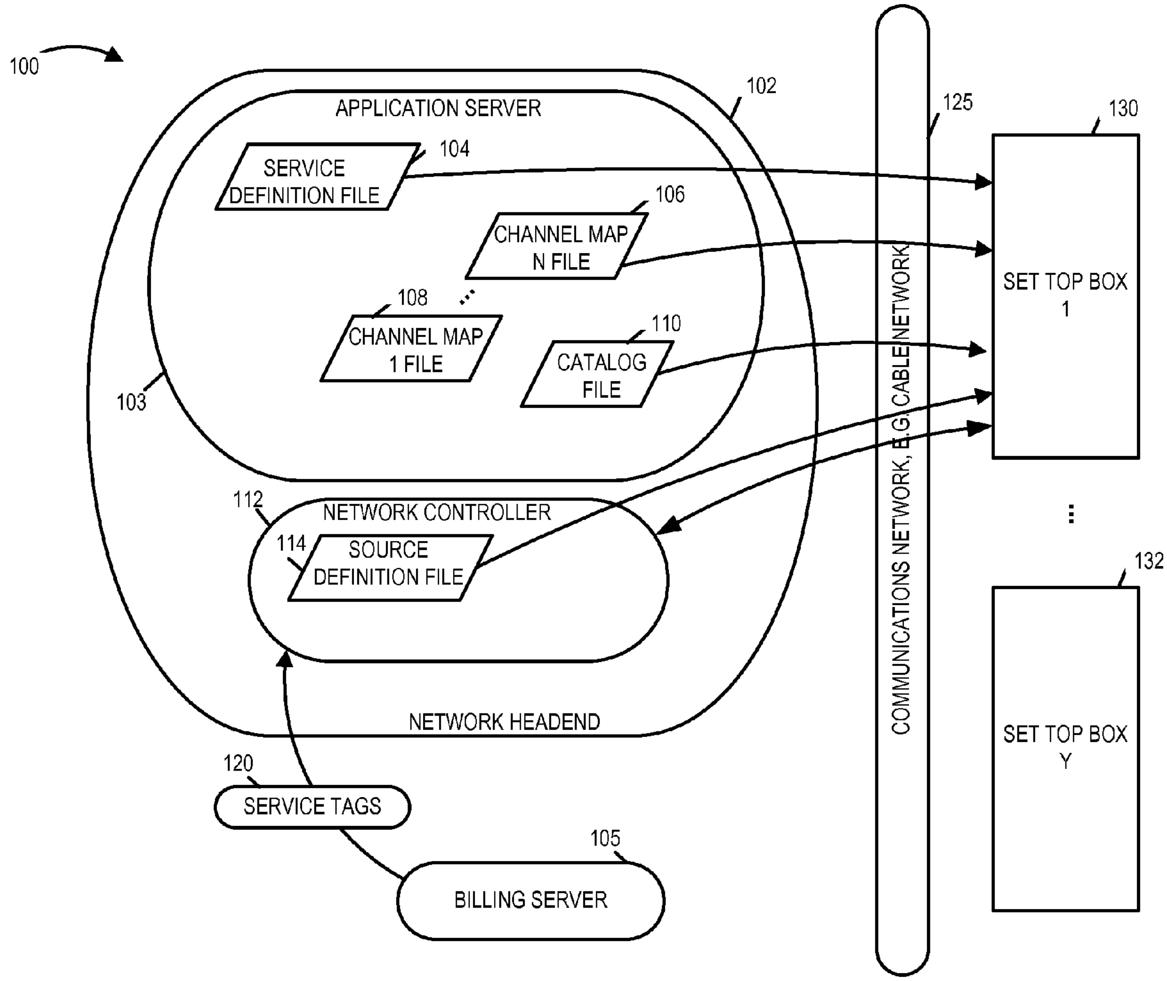
FIG. 1 illustrates a known communications network.
Figure 2:
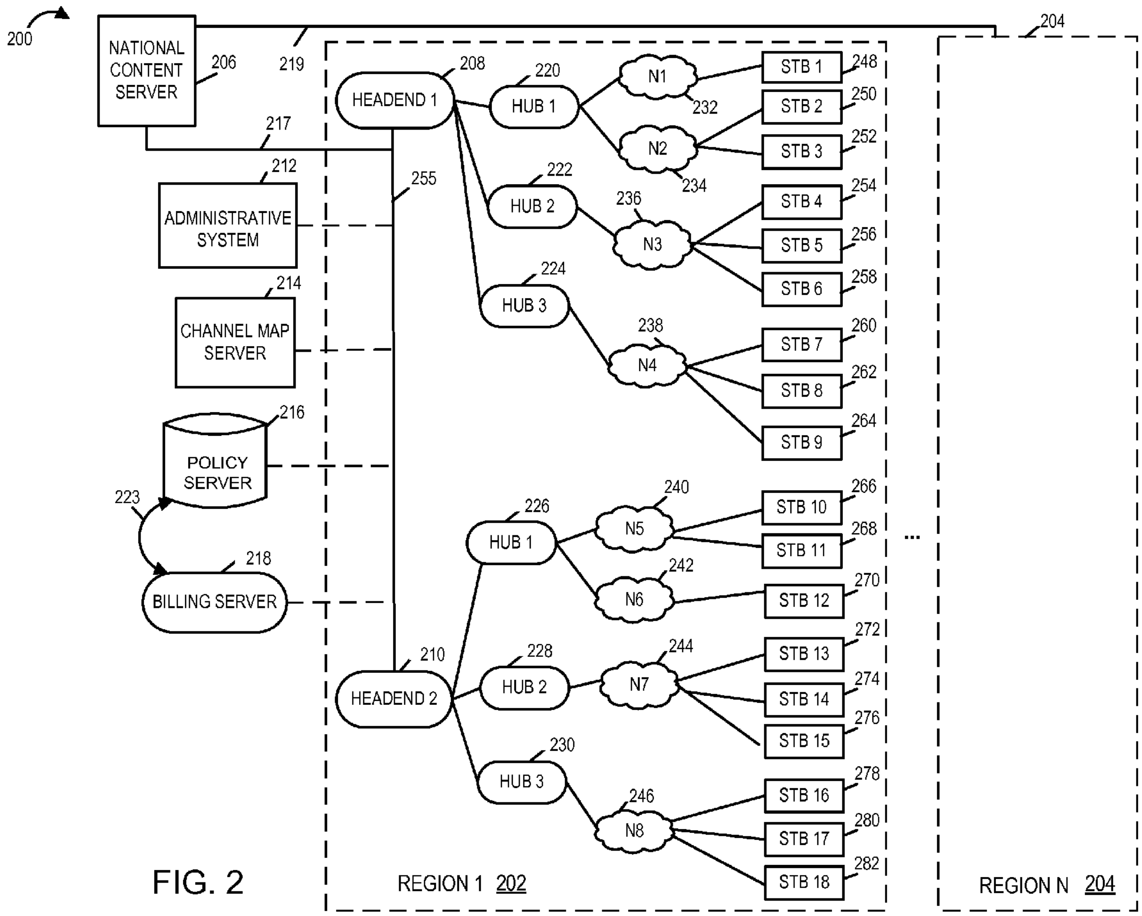
FIG. 2 illustrates an exemplary communications system implemented in accordance with the present invention.

FIG. 2 illustrates an exemplary content delivery and distribution system 200 supporting generation and delivery of channel map enhancement files in accordance with the invention. The system 200 also supports the provisioning, selection, notification, communication, and billing of content to customers in accordance with various embodiments of the present invention. Shown in FIG. 2, are a plurality of regions, e.g., region 1 202 through region N 204, which form a part of the exemplary system 200. In addition to various elements and subsystems associated with regions 202, 204 which are discussed below, system 200 includes a national content server 206, a billing server 218, an administrative system 212, a policy server 216, and a channel map server 214.

In the illustrated embodiment, some regions, e.g., region 1 202, include a plurality of network head ends, e.g., regional service provider systems, including network head end 1 302 and network head end 2 210. Each headend, e.g., headend 1 208, headend 2 210, has a corresponding set of customer premise devices, e.g., set top box (STB) devices to serve. Headends 1 208 and 2 210 may represent two different operating divisions. Region 1 headends 208 and 210 are coupled together, e.g., via link 255. Other elements such as the billing server 218, administrative system 212, policy server 216, and the channel map server 214 may be exchange information and signaling with the network headends 208, 210, e.g., via backhaul links. Network headends in each of the regions (202 and 204) are coupled to the national content server 206 thereby allowing content to be passed between the network headends and the national content server 206. For example, each of the network headends (208, 210) in region 1 202 are coupled to the national content server 206 via link 217, and region 2 204 headends are coupled to the national content server via link 219. Each of the headends 208, 210 is shown in the system 200 as having three hubs, e.g., Hub 1 220, Hub 2 222, and Hub 3 224. Each Hub may be coupled to one or more network nodes, e.g., N1 232, N2 234, etc., as shown. Each of the hubs shown in the system 200 has an associated hub identifier. Each network node represents a physically separate communications path between one or a group of user STB devices, and a processing center. In some embodiments, some hubs are in different franchise areas. For example, the system 200 Hub 1 220 is in a different franchise area than Hubs 2 222 and 3 224 that has separate agreement on local programming coverage, and Emergency Alert System Zone (EAS) requirements.

In the example of FIG. 2 system, the communications path, e.g., for delivery of content, from the headend 1 208 to STB devices 248, 250, 252 includes hub 1 220 and network nodes 232 and 234, where STB1 248 is coupled to network node N1 232 while STB devices 250, 252 are coupled to node N2 234. The communications path from the headend 1 208 to STB devices 254, 256 and 258 includes hub 2 222 and the network node N3 236. The communications path from the headend 1 208 to STB devices 260, 262, 264 includes hub 3 224 and network node N4 238.

Similarly, the communications path for delivery of content from the headend 2 210 to STB devices 266, 268, 270 includes hub 1 226 and network nodes 240 and 242, where STB10 266 and STB 11 268 are coupled to network node N5 240 while STB12 270 is coupled to node N6 242. The communications path from the headend 2 210 to STB devices 272, 274 and 276 includes hub 2 228 and the network node N7 244. The communications path from the headend 2 210 to STB devices 278, 280, 282 includes hub 3 230 and network node N8 246.

National content server 206 processes requests for content and accesses content from, e.g., a national content storage, in the event when a user requested content is not available locally to the user from the serving headend.

The administrative system 212, among other things, is responsible for defining services for customers based on their subscription package, and business policies. The administrative system 212 is also responsible for creating various files, applications etc., in the network headends to support customer STB device operations. In some embodiments the administrative system 212 is also responsive to requests from user STB devices, e.g., for on demand content, upgrades, billing related queries etc. In some embodiments, the administrative system 212 is capable of supporting interaction directly with the customers, e.g. through telephone, web browser, and through the features and functionality provided in the user STB devices 248 through 282.

The channel map server 214 is responsible for generating channel map enhancement files on the request of users of the STB devices based on the user account, subscriptions and other business rules that may apply to the user requesting the channel map enhancement files. In some embodiments the channel map server 214 interacts with the policy server 216 which includes database information on user STB devices, user accounts and services. The policy server 216 also includes business rules established by the administrative system 212, and remains synchronized with the billing server 218 through the network link 223. The channel map server may load and/or store business rules and/or other policy based rules and select the ones relevant to a particular set top box in response to a request for channel map information.

Billing server 218 is shared by a plurality of headends in each of the regions (202, 204) shown in system 200, however in some embodiments individually different billing servers may be implemented to serve each region. The billing server 218 under the control of the administrative system 212, generates service tags which relate to one or more services which may be provided to customers. The billing server 218 processes billing information corresponding to customers from different regions (202, 204), and also stores customer subscription related information. Billing server 218 updates billing charge information in response to changes in the set top box being supplied, video on demand purchases, and/or other activity, and also processes bill payment information e.g., credit card transactions, deductions from debit accounts, mail bills, and/or processes discount and/or coupon information.

Figure 3:
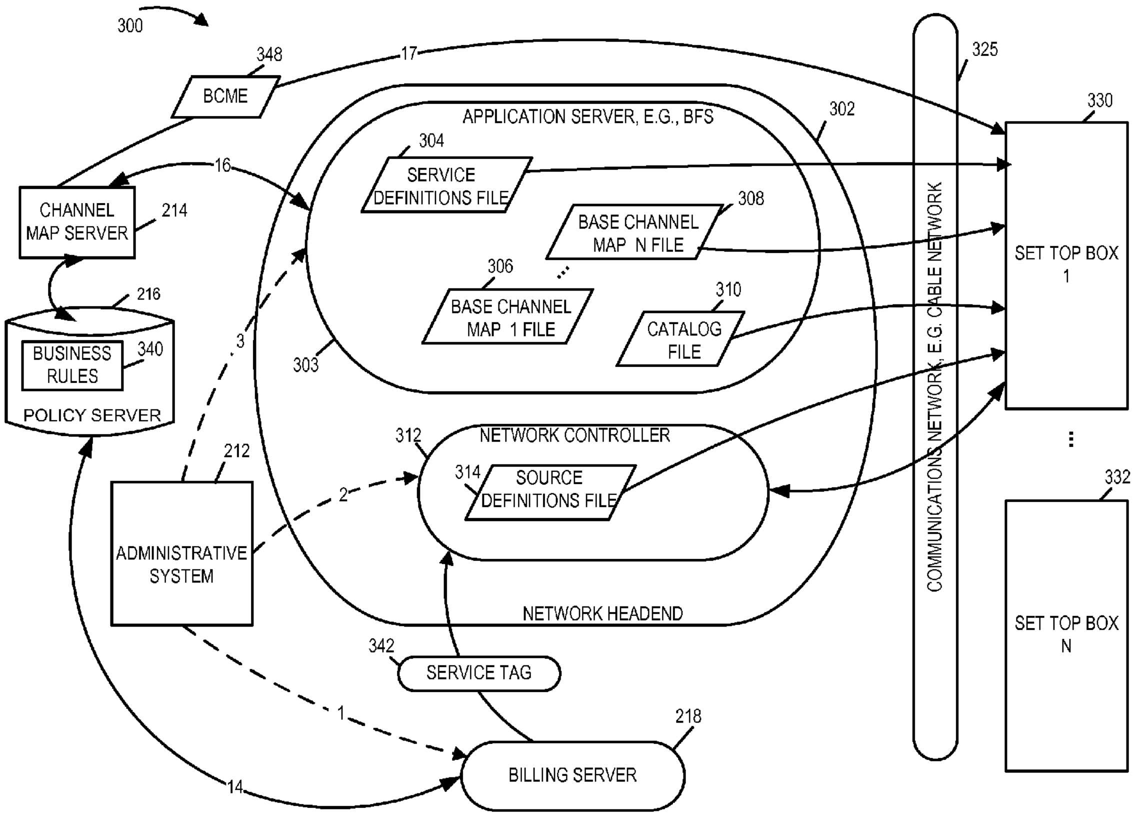
FIG. 3 is a more detailed illustration of a portion of the communications system shown in FIG. 2.

FIG. 3 is a more detailed drawing of an exemplary subsystem 300 which forms a part of the communications network 200 of FIG. 2. Several elements which are the same or similar to the elements of system 200 illustrated in FIG. 2 have been identified in FIG. 3 using same reference numbers as used in FIG. 2. The subsystem includes a service provider system/network headend 302 which could be used as headend 208 or 210, the channel map server 214, a policy server 216, an administrative system 212, a billing server 218. The network headend 302 serves a corresponding set of customer premise devices, e.g., set top boxes, including set box 1 330 through set top box N 332. FIG. 3, illustrates the network headend 302, relationship of various elements of the network headend, and signaling between various elements of the subsystem 300 in greater detail. The network head end 302 includes various elements which support and enable the service provider to deliver programming content, one or more files, secure messages etc., to user STB devices 330, 332, in accordance with various embodiments of the present invention.

The user STB devices 330, 332 are coupled to the network head end 302 via a communications network 325, e.g. a cable network. The communications network 325 in some embodiments include a network of network links, hubs and network nodes as shown in detail in FIG. 2, which together form a communications path between the network headend 302 and the STB devices 330, 332.

The operation and functions of the administrative system 212, the channel map server 214, policy server 216, and the billing server 218 have been discussed in FIG. 2 example, accordingly entire operation of these elements will not be discussed in detail again. In addition to the functions performed by the administrative system 212 discussed in FIG. 2, the administrative system 212 also creates a service code in the billing server 218 that associates a service tag (e.g., from service tags 342) to one or more services. Thus, the service tags 342 include information regarding one or more services. The administrative system 212 is also responsible for generating entitlement identifiers (EIDs) identifying entitlements for one or more user STB devices. The administrative system 212 is further responsible for associating service tag(s) with the one or more generated entitlement IDs.

The entitlements define possible services which a subscriber may be entitled to get, e.g., based on the level of subscription. There can be a plurality of entitlements which are created in the network headend 302 by the administrative system 212. Thus, STB devices (330, 332) which receive EIDs from the headend 302 can decode from one or more assigned EIDs, as to which services the STB devices (330, 332) are entitled to get from the network headend 302, since the EIDs are associated to the service tags which again relate to services. From the above it should be appreciated that not all the STB devices get the same EIDs as they may have different levels of subscription, or due to different business policies that may apply to the devices based on different factors, e.g., STB location, or association of STB devices to a group, company, community etc.

The network headend 302 includes an application server 303 and a network controller 312, each one capable of generating one or more files shown in the figure, under the control of the administrative system 212. In some embodiments the application server is implemented as a broadcast filer server (BFS). In accordance with one aspect, the administrative system 212 creates a source definitions file 314 in the network controller 312, including source definitions. A source definition describes the attributes of a source of content to be provided by the headend, e.g., whether source content is analog or digital, a corresponding frequency of the programming content from a source, program number associated with digital programming content treams, applications associated with the content etc. The administrative system further associates source IDs with source definitions. For illustration purposes, the control signaling, e.g., for creating one or more definitions and/or files as the service tags, source definitions, from the administrative system 212 to the billing server 218, network controller 312 and the application server 303, is shown using arrows 1, 2 and 3 respectively.

The administrative system 212 also creates a service definitions file 304 including service definitions, in the application server 303. A service definition describes the attributes of a service, e.g., type of service, a display name of the service, source identification information for identifying programming content streams from different content providers (source ID), etc. In a system, such as the one shown in FIG. 2 example, a plurality of headends are present and each includes an application server. In some embodiments at least one service definitions file is created per application sever. In accordance with one aspect, the administrative system 212 further creates one or more base channel map files 306, 308, and a catalog file 310. The base channel map files 306, 308 include information related to the basic services and/or programs to be provided to a number of customer set top box devices 330, 332 in the network. The base channel map files 306, 308 also include channel display related information such as channel display number, and in some embodiments may further include programming content related information. A single base channel map file may be associated to one or a group of set top box devices in the network, e.g., based on set top box device location, user subscriptions and other additional factors etc. The catalog file 310 includes a criteria for associating the channel map files 306 through 308 to a given set of set top box devices 330, 332, e.g., by way of Hub IDs, EIDs, or other parameters, as will be discussed later in greater detail.

The channel map server 214 is responsible for generating channel map enhancement (BCME) files on the request of users of the STB devices based on the user account, subscriptions and other business rules that may apply to the user requesting the BCME files. In some embodiments the channel map server 214 interacts with the policy server 216 which includes database information on user STB devices, user accounts and services.

In accordance with the invention, the application server 303 broadcasts one or more base channel map files 306, 308 to various user STB devices in the network. In one embodiment base channel map files 306, 308 are created to include information related to basic services which are to be provided to all STB devices which are served by the network headend 302. The channel map server 214 remains in synchronization with the application server 303 (and other application servers in different headends) to obtain the service definitions file 304 as shown using arrow 16. After receiving a base channel map file, one or more user STB devices in said plurality of user STB devices 330, 332 may request BCME files (e.g., BCME 348) from the channel map server 214 which in turn communicates the BCME file 348 to the requesting STB device, e.g., to STB 1 330, as shown using arrow 17. The BCME file for a given set top box includes enhanced service information that applies to that particular STB device which requested the BCME file.

Figure 4:
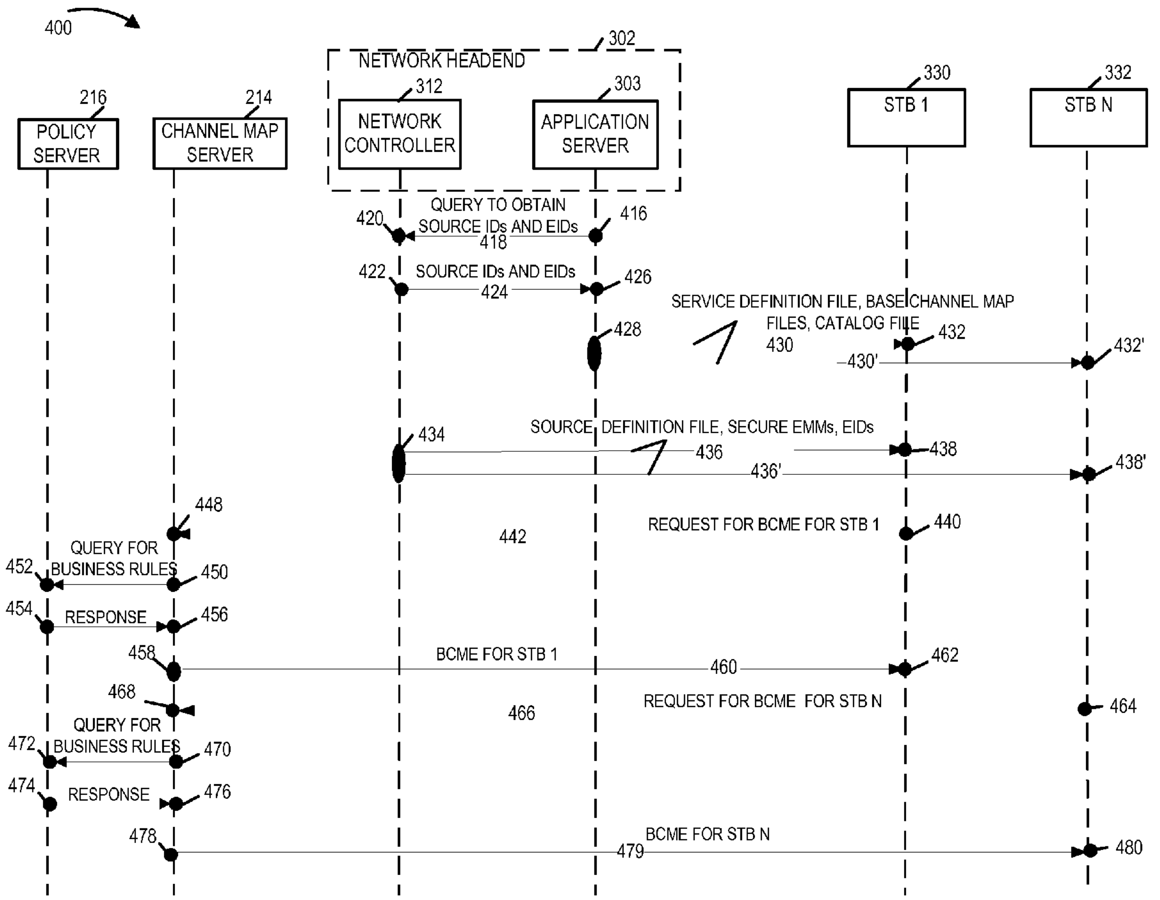
FIG. 4 illustrates the signaling and steps associated with one exemplary method where base channel map enhancement files are generated and delivered to one or more user set top box devices, in accordance with the present invention.

FIG. 4 which illustrates the signaling and steps associated with generating and delivering BCME (BCME) information to one or more user set top box devices in accordance with the present invention. At the top of FIG. 4, various elements of the system 300 which may participate in the signaling and message exchange associated with the process of BCME file creation and distribution are shown. The illustrated components include channel map server 214, policy server 216, network headend 302 including the application server 303 and the network controller 312, STB 1 330, and STB N 332. It is understood that the signaling exchange between the STB devices (e.g. STB 1 330 and STB N 332) and the network headend 302, may and in some cases does, occur over the communications network 325, as shown in FIG. 3.

For the purposes of an example discussed here, it will be assumed that STB 1 330 and STB N 332 are in different geographic regions and are serviced by different headends. STB's 330 and 332 correspond to different businesses or a business and a residence and both have separate agreements with the service provider system, e.g., the network headend 302, regarding the local programming coverage, enabled services, channel lineup etc.

In the FIG. 4 example, in step 416, the application server 303 queries the network controller 312 (as represented by arrow 418) to obtain source IDs associated with the source definitions created by the administrative system 212, and to obtain the EIDs associated with various entitlements. The network controller 312 receives the query in step 420 and begins processing the query. In step 422 the network controller 312 sends the source IDs and the EIDs to the application server 303 which receives them in step 426. In step 428 the applications server 303 communicates to a first plurality of set top boxes, e.g., including STB 1 330 through STB N 332, a first service definition file including a plurality of service definitions, different service definitions being identified in said service definition file by different service identifiers, different service definitions including different information used to provide a content related service. In addition, the application server 303 also communicates a first base channel map, e.g., such as base channel map 306, to said first plurality of set top boxes, said first base channel map including information associating program channels with service identifiers, said base channel map providing for individual service identifiers corresponding program channel display numbers. A catalog file such as file 310 is also communicated to the plurality of set top boxes. The communication of files is shown in FIG. 4 example using arrows 430, 430'. The files are received by the STB devices in step 432, 432'.

In step 434 a source definitions file and secure Entitlement messages (EMM) are communicated to the plurality of STB devices 330, 332. The EMMs are broadcast by the network controller 312 periodically and may be sent independently than the source definitions file. The secure EMMs associate the applicable entitlement IDs to the STB devices 330, 332.

In step 440 the first STB 330 sends a first request for base channel map enhancement (BCME) information (arrow 442), to the channel map server 214. The channel map server 214 receives the first request from the STB device 330 in step 448 and processes the request. In some embodiments first request (442) for base channel map enhancement information includes at least one of a first entitlement identifier corresponding to the set top box 330 and a set top box identifier (e.g., mac address or IP address) corresponding to said set top box 330. Upon receiving the request for BCME files in steps 448 from the STB devices 330, the channel map server 214 recognizes the STB device, e.g., using the mac address of the requesting STB devices.

In step 450 the channel map server 214 checks to see if it has stored rules applicable to the STB from which the request was received and, if so it accesses and uses the stored rules. In the FIG. 4 example, it is assumed that the channel map server does not have the required rules already stored and the channel map server 214 proceeds to query, in step 450, the business policy server 216 to determine, based on at least one of said first entitlement identifier and first set top box 330 identifier, a first business policy rule applicable to said first set top box 330. In step 452 the business policy server 216 processes the query from the channel map server 214, and communicates the business policy rules, business data and/or other relevant information applicable to the individual STB device 330 to the channel map server 214.

Following the receipt of business policy rules in step 456 the channel map server 214 generates the first base channel map enhancement file based on first business policy rule applicable to the first STB 330. In this manner the channel map enhancement file is dynamically generated on an as needed basis. In step 458 the channel map server 214 communicates in response to the first request for BCME, the generated first BCME information file (as shown using arrow 460) to the first STB 330 (arrow 460). The first BCME information file, received in step 462, provides base channel map supplementation information to the STB 330.

The process of requesting base channel map enhancement information and the channel map server 214 responding with the requested information, e.g., information which is dynamically generated in response to the request based on business policy rules, repeats over time with requests being received and processed from STBs in multiple different franchise and/or geographic regions.

For example, in step 464 the STB device 332 sends a request (arrow 466) for base channel map enhancement (BCME) information, to the channel map server 214. The channel map server 214 receives the second request, e.g., request from STB N 332, for BCME information in step 468. In some embodiments the STB devices 330, 332 belong to a first subset of the first plurality of STB devices. In some embodiments second request (466) for base channel map enhancement information includes at least one of a second entitlement identifier corresponding to the STB N 332 and a set top box identifier (e.g., mac address or IP address) corresponding to said STB N 332.

The channel map server 214 requests applicable business rule information to be used in generating the updated channel map for STB N 332 in step 470 by sending a query which is received by the policy server in step 472. The policy server 216 responds in step 474 by communicating the applicable rule(s), e.g., a second business rule, which are received by the channel map server in step 476.

Following the receipt of business policy rules in step 476 the channel map server 214 generates a second base channel map enhancement file based on the second business policy rule applicable to the STB 332. In step 478 the channel map server 214 communicates, in response to the second request for BCME, the generated second BCME information file (arrow 479) to the STB 332. In some embodiments the first and second business policy rules result in different channel display numbers being used by the set top box 330 for the same service, said different channel display numbers causing the order of program channels to be different at STB 330 and second set top boxes.

In some embodiments the first BCME file specifies a different channel display number to be used for a first service than a channel display number specified for said first service in said second base channel map enhancement file.

The individual set top boxes 330 and 332 merge the BCME file information received from the channel map server with the base channel map information received from the broadcast file server in the headend to produce a combined channel map which is used to gain access to the services to which the individual set top box is entitled.

In the above described manner set top boxes corresponding to a hotel chain can be supplied with customized channel maps based on businesses policies, without being subject to geographic limitations with regard to obtaining a customized channel map, and without the need for excessive copying or duplication of files in the broadcast file servers (application servers) located in regional headends.

FIG. 5 illustrates an exemplary base channel map file 500 which may be broadcast to one or a group of STB devices served by a headend 302 as discussed in FIG. 3 example. The base channel map file 500 could be any one of the base channel map files 306, 308 discussed in FIG. 3. The base channel map file 500 may apply to a set of STB devices, e.g., in a given franchise area, served by a service provider system/network headend such as headend 302. In some embodiments the base channel map file 500 includes information regarding the basic services available to the corresponding set of STB devices and default channel mapping for programming content and/or services, as set by the service provider.

The base channel map file 500 includes a plurality of rows and columns showing information. The information included in the base channel map is not displayed to a customer but rather the information is used by a customer STB device, e.g., in constructing a program guide (which may be displayed), and in obtaining one or more parameters which may be used to gain access to services and/or programming content. Column 502 includes service IDs associated with service definitions in the service definitions file, e.g., 304. Column 504 is for service names for different services. Column 506 includes channel display number information for each of the corresponding services in different rows. Column 508 includes logo identifier information.

In the base channel map file 500, each row corresponds to a different service identifier and shows a plurality of entries. Each service ID in column 502 corresponds to a service which is available to the user of the receiving STB device. As an example, illustrated base channel map include rows 512, 514, 516, . . . , 520. Row 512 corresponds to service ID 0000, Row 514 corresponds to service ID 0001, row 516 corresponds to service ID 0010, and so on. It should be appreciated that 4 bit value for a service ID is shown as an example and it is understood that the number of bits may be more or less. Each entry in column 504 shows a service name corresponding to the service identified by the service identifier shown in the corresponding row. For example, the first entry in column 504 shows that service name corresponding to service ID 0000 in row 512 is NBC. Each entry in column 506 identifies a channel display number on which the corresponding service identified by the service ID shown in the corresponding row, is supposed to be displayed. Similarly each entry in column 508 includes a logo identifier such as L1, L2, L3, with each entry identifying a logo file, e.g., an image file, to be used for display for the corresponding service identified by the service ID shown in the corresponding row. Different logo images are associated with different services, for example NBC has a different display logo and CNN has a different logo. In some embodiments the STB devices 330, 332 store one or more logos sent from the headend 302, and identifies the stored logo for display purposes using the logo ID in the channel map file 500.

FIG. 6 illustrates an exemplary service definitions file 600 created by the administrative system 212 in the application server 303, in accordance with the invention. The service definitions file 600 can be used as the service definitions file 304 shown in FIG. 3. The service definitions file 600 includes service definitions. The service definition describes the attributes of a service, e.g., type of service, a display name of the service, identification information for various programming content streams (source ID), etc. In some embodiments the applications servers continuously broadcast service definitions file on the network (to corresponding set of customer STB devices being served by the headends to which the application servers belong). It should be appreciated that the information included in the service definitions file 600 is also used by the channel map server 214 for generating BCME files. The service definitions file 600 is a complete file in the sense that it includes service definitions/attributes for all services supported by a network headend which is supplying the service definition file 600.

Each of the services defined in the service definitions file is associated with a service ID. The service definitions file 600 includes a plurality of rows and columns showing information which relate to one or more services. The information included in the service definitions file 600 is used by a customer STB device to perform various functions related to accessing services and displaying programming content.

The exemplary service definitions file 600 illustrated in the example of FIG. 6 includes columns 602 through 616 and rows 620 through 636 as shown. Each row in the service definitions file 600 corresponds to a different service definition, and shows a plurality of entries. Column 602 includes service IDs associated with various services. Row 620 corresponds to service ID 0000, Row 622 corresponds to service ID 0001, and so on as shown. Each entry in column 604 indicates a service type, of the corresponding service identified by the service ID shown in the corresponding row. For example, the first entry in column 604 corresponds to service ID 0000 in row 620 and indicates the service type is REGULAR, e.g., regular TV broadcast. However the fourth entry in column 604 which corresponds to service ID 0011 in row 626 indicates that the service type is ON DEMAND. Each entry in column 606 is a source ID identifying the programming content stream for the corresponding service (e.g., NBC, HBO etc.) identified by the service ID shown in the corresponding row. The source IDs and programming content streams are discussed in more detail in FIG. 7.

Each entry in column 608 indicates an Entitlement ID which relates to the corresponding service identified by the service ID shown in the corresponding row. It should be appreciated that one or more customer STB devices separately receive EIDs and stores the EIDs in the device memory.

Each entry in column 610 identifies a channel display number on which the corresponding service identified by the service ID shown in the corresponding row, is supposed to be displayed. Each entry in column 612 identifies the service name corresponding to the service identified by the service ID shown in the corresponding row. Each entry in column 614 is an application identifier which identifies an application to be executed by a STB device to access and/or display the corresponding service identified by the service ID shown in the corresponding row. In some embodiments a plurality of applications are stored in the customer STB devices by the service provider and are identified by the application IDs. Thus, using the application ID, the STB can call and execute the corresponding stored application when needed. Each entry in column 616 identifies a guide identifier.

FIG. 7 illustrates an exemplary source definitions file 700 created by the administrative system 212 in the application server 303, in accordance with the invention. The source definitions file 700 may be used as the source definitions file 314 shown in FIG. 3. The source definitions file 700 include source definitions, each of which describes the attributes of a source of programming content to be provided by the network. This includes information regarding the source, e.g., provider of the content, identification information of programming content from different sources, type of the content (such as Analog video content or Digital video content), program number information, a corresponding frequency to receive programming content etc. In some embodiments the network controllers (e.g., network controller 312) continuously broadcast source definitions file on the network (to corresponding set of customer STB devices being served by the headends to which the network controllers belong).

Different source definitions in the file 700 are discussed with the help of different source IDs. It should be appreciated that source ID information is also included in a service definitions file 600, and thus using the source ID and service ID mapping, the source definitions in file 700 can be mapped to services identified by the service IDs included in the service definition file and channel map files. The source definitions file 700 includes a plurality of rows and columns showing information which relate to one or more sources. The information included in the source definitions file 700 is used by a customer STB device to, e.g., gain access to services and displaying programming content. Sometimes the information included in the source definitions file 700 is used in combination with information included in one or more other files such as service definition file, e.g., to gain access to services and displaying programming content.

Source definitions file 700 illustrated in the example of FIG. 7 includes columns 702 through 710 and rows 712 through 720 as shown. Each row in the file 700 corresponds to a different source identified by the corresponding source ID. Column 702 includes source IDs corresponding to various programming content streams. Row 712 corresponds to source ID 00001, Row 714 corresponds to source ID 00010, and so on as shown. Each source identifier identifies a programming content stream corresponding to an individual service, e.g., NBC, CNN, etc., identified by the service name shown in the corresponding row. In various embodiments a programming content stream includes programming content corresponding to a service, e.g., a provider of the content such as CNN, and advertisement content and/or other information. The advertisement content generally varies for different franchise areas, advertisement zones etc.

Column 704 includes service names for the content providers which provide programming content included in the programming content streams identified by the source IDs. Thus each entry in column 704 identifies a service name of the content provider providing programming content included in the programming identified by the source ID shown in the corresponding row. In some embodiments there may be a plurality of programming content streams (identified by different source IDs) corresponding to a single service such as NBC, e.g., depending on different advertisement zones. For example, the first and second entries in column 704 corresponds to source ID 00001 and source ID 01001 in rows 712, 714 respectively both identify NBC as the provider of the programming content. The programming content from NBC could be the same in both of the programming content streams identified by the different source IDs, however the advertisement content is different due to different advertisement zones. For example, the programming content stream identified by source ID 00001 is sent to customers in a region/location which corresponds to advertisement zone 1 while the programming content stream identified by source ID 01001 is sent to customers in a region/location corresponding to advertisement zone 2. Thus the customers receiving the different programming content streams will get the same programming content from NBC but will receive different advertisement content.

Each entry in column 706 indicates a content type, e.g., whether content from the corresponding source is Analog or Digital. Each entry in column 708 indicates a program number for the digital programming content streams. Analog programming content does not have a corresponding program number and therefore the entry corresponding to the analaog programming content is left blank. A program number may be, e.g., in one exemplary MPEG-2 embodiment, a PID (packet ID) corresponding to a program map table that includes information identifying PIDs corresponding to the elementary streams which correspond to a particular program. Thus, a program number may be used to determine identifiers which can identify packets corresponding to the audio, video and/or other content corresponding to a program. Each entry in column 710 indicates a frequency over which the programming content stream identified by the source ID may be received.

FIGS. 8 and 9 are used to illustrate an example to facilitate the understanding regarding the base channel map enhancement (BCME) files. FIGS. 8 and 9 illustrate two different base channel map enhancement files 800 and 900 respectively. For this example, it is assumed that BCME files 800 and 900 are communicated to two different STB devices, e.g., say S1 and S2, which earlier received same base channel map file, e.g., base channel map 500. It is further assumed that one STB device S1 resides in a house while S2 resides in a Hotel company having a number of facilities and the Hotel company has business arrangements with the service provider so that they get a common channel lineup, so that same network appears on same channel display number for all STB devices throughout the hotel chain. Furthermore, user of devices S1 has also setup his subscription account with the service provider so that various sports related networks, e.g., ESPN, Fox Sports, etc., appear on lower channel display numbers.

After receiving the same base channel map file, the two STB devices S1 and S2 establish a communications session with the channel map server 214, and individually request customized enhancement information, i.e., a BCME file, for the devices. The channel map server 214 identifies the STB devices S1 and S2, e.g., via MAC address, and obtains rules and data from the policy server 216 that applies to the customer/company accounts to which the STB devices S1 and S2 correspond. The channel map server 214 then generates and communicates the individual BCME files 800 and 900 to STB devices S1 and S2 respectively.

Columns and rows in each of the files 800 and 900, are similar in nature to the ones discussed with regard to the base channel map file 600, however the information included in the BCME files 800 and 900 specifically applies to STB devices S1 and S2 respectively. As shown in the BCME files 800 and 900, columns 802, 902 includes service IDs for various services, and each row corresponds to a different service identifier. It should be appreciated that as per requirements set by the user of STB device S1, the BCME file 800 is generated such that Sports related services, e.g., ESPN, and Fox Sports, are arranged as to appear on lower channel display numbers (see column 806) for user viewing. For example, as shown in column 806, Fox Sports which corresponds to service ID 0010 (in this particular example) will appear on channel display number 1, and ESPN which corresponds to service ID 0100 will appear on channel display number 2, for user of STB S1.

Similarly, as per requirements set by the Hotel company where STB device S2 resides, the BCME file 900 for STB S2 is generated such that NBC which corresponds to service ID 0000 will appear on channel display number 1, ABC which corresponds to service ID 0001 will appear on channel display number 2, Fox Sports which corresponds to service ID 0010 will appear on channel display number 7, HBO on demand which corresponds to service ID 0011 will appear on channel display number 9, throughout the Hotel company (see Column 906).

FIG. 10 illustrates a catalog file 1000 used in an exemplary embodiment in accordance with the invention. The catalog file 1000 may be used as the catalog file 310 shown in FIG. 3. For illustration purposes, reference to FIG. 3 will be made in the following discussion. The catalog file 1000 includes a criteria for associating the base channel map files (e.g., such as files 306 through 308 of FIG. 3) to a given set of set top box devices, e.g., by way of Hub IDs, Entitlement IDs (EIDs), or other parameters. In accordance with one aspect, a network controller such as network controller 312 of headend 302, periodically broadcasts (to STB devices being served by the headend) secure entitlement messages associating entitlement IDs to the STB devices. The STB device recovers and stores the EIDs in the device memory. The headend 302 also broadcast out a catalog file 310 (1000) on the network. When a STB device boots up, it determines the associated Hub ID from the particular communications path which couples the STB device to the network headend. The STB device then loads the catalog file 1000 from the network. An application on the STB device will compare each entry in the catalog file 1000, which are discussed below, against the EIDs stored in its memory, to determine if a specific EID or Hub ID association for a base channel map file is available. If the application finds an entry for an EID or Hub ID associated with the STB device, in the catalog file 1000, it loads up the base channel map file corresponding to that EID.

Catalog file 1000 illustrated in the example of FIG. 10 includes columns 1002 through 1006 and rows 1012 through 1020 as shown. Each row in the file 1000 corresponds to an EID and various EIDs are included in column 1002. Column 1004 includes Hub IDs and Column 1006 includes information indicating a corresponding base channel map file (e.g., BM1, BM2, BM3, BM4 etc.) for each of the corresponding EIDs in different rows. A STB device can look up information in the catalog file 1000 to determine which base channel map (e.g., out of the BM1, BM2, BM3 etc., in column 1006) it is associated with, via the EID stored in its memory. For example, if STB 330 has an EID, e.g., A1, stored in its memory, it may look up the catalog file 1000 and can find that it should load base channel map file BM1. However, in some embodiments, if the EID or the Hub ID associated to a STB device is not found in the catalog file 1000, then that STB device will load a default channel map file which may be predetermined or known to the STB device. In some embodiments, when both an EID and a Hub ID are available in the catalog file 1000, corresponding to a STB which seeks to determine which base channel map file to load, the STB device will use EID as the criteria to pick the base channel map.

In various embodiments system elements described herein are implemented using one or more modules which are used to perform the steps corresponding to one or more methods of the present invention, for example, communicating service definitions file to a first plurality of set top boxes, communicating base channel map files to a first plurality of set top boxes, receiving a first request from a first set top box for base channel map enhancement information, providing said base channel map enhancement file providing base channel map supplementation information. Each step may be performed by one or more different software instructions executed by a computer processor, e.g., a central processing unit (CPU).

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of providing program channel and service information comprising:

broadcasting, to a first plurality of set top boxes, a first service definition file including a plurality of service definitions, service definitions being identified in said service definition file by different service identifiers, said first plurality of set top boxes including at least some set top boxes which are not entitled to receive some of the services for which service definitions are provided in said first service definition file, different service definitions including different information, information included in one of the service definitions being used to provide a content related service corresponding to said one of the service definitions, said one of said service definitions including a first entitlement identifier, devices with said entitlement identifier being authorized to receive the service corresponding to said one of said service definitions;

operating a first server to communicate a first base channel map to said first plurality of set top boxes, said first base channel map including information associating program channels with service identifiers included in said first service definition file, said base channel map providing for individual service identifiers corresponding program channel display numbers;

receiving, at a second server, a first request from a first set top box corresponding to a first subset of said first plurality of set top boxes for base channel map enhancement information, said first set top box being one of said first plurality of set top boxes, said second server being different from said first server; and operating said second server to provide a first base channel map enhancement file to said first set top box in response to said first request.

2. A method of providing program channel and service information comprising:

broadcasting, to a first plurality of set top boxes, a first service definition file including a plurality of service definitions, service definitions being identified in said service definition file by different service identifiers, said first plurality of set top boxes including at least some set top boxes which are not entitled to receive some of the services for which service definitions are provided in said first service definition file, different service definitions including different information, information included in one of the service definitions being used to provide a content related service corresponding to said one of the service definitions;

operating a first server to communicate a first base channel map to said first plurality of set to boxes, said first base channel may including information associating program channels with service identifiers included in said first service definition file, said base channel map providing for individual service identifiers corresponding program channel display numbers;

receiving, at a second server, a first request from a first set top box corresponding to a first subset of said first plurality of set top boxes for base channel map enhancement information, said first set top box being one of said first plurality of set top boxes, said second server being different from said first server;

operating said second server to provide a first base channel map enhancement file to said first set top box in response to said first request;

operating a network controller to communicate a first secure message including a first entitlement identifier to the first set top box in said first plurality of set top boxes; and operating the network controller to communicate a second secure message including a second entitlement identifier to a second set top box in said first plurality of set top boxes;

wherein said second server is a channel map server which is responsive to requests from individual set top boxes for channel map enhancement information, said first request being one of said requests for channel map enhancement information, said first request including said first entitlement identifier.

3. The method of claim 2, wherein said first request for base channel map enhancement information includes both said first entitlement identifier corresponding to the first set top box and a set top box identifier corresponding to said first set top box, said first entitlement identifier identifying a service which the first set top box is entitled to receive, the method further comprising:

determining, at the second server, based on said first entitlement identifier and said first set top box identifier a business policy rule applicable to said first set top box; and generating said first base channel map enhancement file based on said business policy rule applicable to said first set top box.

4. The method of claim 3, wherein determining at the second server, a business policy rule applicable to said first set top box includes:

operating said channel map server to query a policy server for said business policy rule applicable to said first set top box; and wherein said first base channel map enhancement file includes base channel map supplementation information for said first set top box, the base channel map supplementation information including additional information intended for use by said first set top box, said additional information associating program channels with service identifiers included in said first service definition file.

5. The method of claim 4, wherein said first server is a first broadcast file server in a first headend that broadcasts said first base channel map to set top boxes in a first region; and wherein said second server provides base channel map enhancement files to a plurality of regions, said first region being one of said plurality of regions, and wherein the method further comprises:

operating the channel map server to receive a request for base channel map enhancement information from a second set top box corresponding to the first subset of said plurality of set top boxes;

operating the channel map server to generate, in response to said request from the second set top box for base channel map enhancement information, a second base channel map enhancement file; and communicating the second base channel map enhancement file to the second set top box.

6. The method of claim 5, wherein generating said second base channel map enhancement file includes:

determining, based on a second entitlement identifier and a second set top box identifier corresponding to said second set top box, a second business policy rule applicable to said second set top box, said second business policy rule being different from said first business policy rule; and generating said second base channel map enhancement file based on said second business policy rule applicable to said second set top box.

7. The method of claim 6, wherein said first base channel map enhancement file specifies a different channel display number to be used for a first service than a channel display number specified for said first service in said second base channel map enhancement file.

8. The method of claim 7, wherein said first and second business policy rules result in different channel display numbers being used by the first and the second set top boxes for the same service, said different channel display numbers causing the order of program channels to be different at said first and second set top boxes.

9. The method of claim 7, further comprising:

operating a second head end located in a different geographic region to communicate a second base channel map to a second plurality of set top boxes, said second base channel map being different from said first base channel map; and operating said channel map server to receive a request from a third set top box for base channel map enhancement information, said third set top box corresponding to a second subset of said second plurality of set top boxes.

10. The method of claim 9, further comprising:

determining based on at least one of a third entitlement identifier and a third set top box identifier that said first business policy rule is applicable to said third set top box; and generating said third base channel map enhancement file based on said first business policy rule, said third base channel map enhancement file having the same content as said first base channel map enhancement file.

11. A system for providing program channel and service information comprising:

a broadcast file server configured to:

broadcast to a first plurality of set top boxes a first service definition file including a plurality of service definitions, different service definitions being identified in said service definition file by different service identifiers, said first plurality of set top boxes including at least some set top boxes which are not entitled to receive some of the services for which service definitions are provided in said first service definition file, different service definitions including different information, information included in one of the service definitions being used to provide a content related service corresponding to said one of the service definitions, said one of said service definitions including a first entitlement identifier, devices with said entitlement identifier being authorized to receive the service corresponding to said one of said service definitions;

broadcast a first base channel map to said first plurality of set top boxes, said first base channel map including information associating program channels with service identifiers, said base channel map providing for individual service identifiers corresponding program channel display numbers; and a channel map server for receiving a first request from a first set top box corresponding to a first subset of said first plurality of set top boxes for base channel map enhancement information, said channel map server being configured to provide, in response to said first request for base channel map enhancement information, a first base channel map enhancement file to said first set top box.

12. The system of claim 11, further comprising:

a network controller configured to:

communicate a first secure message including a first entitlement identifier to the first set top box in said first plurality of set top boxes; and communicate a second secure message including a second entitlement identifier to a second set top box in said first plurality of set top boxes.

13. The system of claim 12, wherein said first request for base channel map enhancement information includes both said first entitlement identifier corresponding to the first set top box and a set top box identifier corresponding to said first set top box, said first entitlement identifier identifying a service which the first set top box is entitled to receive the system further comprising:

business policy rules stored in a business policy server; and a business policy rule determination module in said channel map server for identifying based on said first entitlement identifier and said first set top box identifier a first business policy rule applicable to said first set top box; and a channel map generation module in said channel map server for generating said first base channel map enhancement file based on said first business policy rule applicable to said first set top box.

14. The system of claim 13, wherein the channel map server is further configured to:

receive a request for base channel map enhancement information from a second set top box corresponding to the first subset of said plurality of set top boxes;

generate, in response to said request from the second set top box for base channel map enhancement information, a second base channel map enhancement file based on a second business policy rule applicable to said second set top box, said second business policy rule being different from said first business policy rule; and communicate the second base channel map enhancement file to the second set top box.

15. The method of claim 1, wherein said first service definition file includes service definitions for all of the services provided by a network headend to which the service definition file corresponds.

16. The method of claim 2, wherein operating the first server to communicate a first base channel map to said first plurality of set top boxes is performed as part of transmitting a plurality of base channel maps to said first plurality of set top boxes, the method further comprising:

transmitting a catalog file including information associating a base channel map file with a hub identifier and the first entitlement identifier; and operating said first set top box to determine which of said plurality of base channel maps to use based on said hub identifier and said first entitlement identifier, at least some different hub identifier and entitlement identifier combinations corresponding to different base channel maps in said plurality of base channel maps.

17. The method of claim 2, further comprising:

operating the second server to generate said first base channel map enhancement file, in response to said first request, using a rule corresponding to said first set top box and information in said first service definition file to generate a base channel map enhancement file.

18. The method of claim 2, further comprising:

operating a set top box which is not capable of sending requests to the channel map server to use a base channel map to obtain access to basic services provided to devices throughout a region without the use of an enhanced channel map.

* * * * *